(12) United States Patent
Tozawa et al.

(10) Patent No.: US 8,991,514 B2
(45) Date of Patent: Mar. 31, 2015

(54) ELECTRIC-POWER CULTIVATOR

(75) Inventors: Katsumi Tozawa, Anjo (JP); Shigeru Takeda, Anjo (JP); Kouji Haneda, Anjo (JP); Mitsunori Watanabe, Anjo (JP)

(73) Assignee: Makita Corporation, Aichi (JP)

( * ) Notice: Subject to any disclaimer, the term of this patent is extended or adjusted under 35 U.S.C. 154(b) by 13 days.

(21) Appl. No.: 13/523,173

(22) Filed: Jun. 14, 2012

(65) Prior Publication Data
US 2013/0014966 A1 Jan. 17, 2013

(30) Foreign Application Priority Data

Jul. 12, 2011 (JP) ................................. 2011-153624

(51) Int. Cl.
*A01B 33/00* (2006.01)
*A01B 33/02* (2006.01)
(52) U.S. Cl.
CPC .................... *A01B 33/028* (2013.01)
USPC ............................................................ 172/42
(58) Field of Classification Search
USPC ............................................... 172/41, 42, 43
See application file for complete search history.

(56) References Cited

U.S. PATENT DOCUMENTS

| 2,823,597 | A | * | 2/1958 | Cadwallader | 172/41 |
| D252,879 | S | * | 9/1979 | Lessig et al. | D15/12 |
| 5,850,882 | A | * | 12/1998 | Link | 172/41 |
| 6,340,061 | B2 | * | 1/2002 | Marshall et al. | 172/41 |
| 6,382,325 | B1 | * | 5/2002 | Bovi | 172/41 |
| 6,435,293 | B1 | * | 8/2002 | Williams | 180/65.1 |
| 6,968,906 | B2 | * | 11/2005 | Ito et al. | 172/41 |
| 7,143,835 | B2 | | 12/2006 | Fukuzumi et al. | |
| 7,237,620 | B2 | * | 7/2007 | Abenroth et al. | 172/42 |
| 7,314,096 | B2 | * | 1/2008 | Shaffer et al. | 172/372 |
| 7,584,804 | B2 | | 9/2009 | Fukuzumi et al. | |
| 8,286,721 | B2 | | 10/2012 | Gerbaud et al. | |
| 2004/0194982 | A1 | | 10/2004 | Fukuzumi et al. | |
| 2006/0070753 | A1 | * | 4/2006 | Lephart et al. | 172/41 |
| 2006/0185861 | A1 | | 8/2006 | Fukuzumi et al. | |
| 2007/0131436 | A1 | * | 6/2007 | Asay | 172/41 |
| 2009/0096399 | A1 | * | 4/2009 | Chen et al. | 318/441 |
| 2009/0322473 | A1 | * | 12/2009 | Aliferis et al. | 340/5.7 |
| 2010/0051299 | A1 | * | 3/2010 | Marcil et al. | 172/42 |
| 2010/0065291 | A1 | | 3/2010 | Gerbaud et al. | |
| 2011/0303425 | A1 | | 12/2011 | Marcil et al. | |

FOREIGN PATENT DOCUMENTS

| EP | 1459615 | 9/2004 |
| EP | 2263434 | 12/2010 |
| FR | 2900285 | 10/2007 |
| JP | 2004-166629 | 6/2004 |
| JP | 4116904 | 4/2008 |
| JP | 2009-22173 | 2/2009 |

(Continued)

OTHER PUBLICATIONS

Search report from E.P.O., mail date is Nov. 15, 2012.
U.S. Appl. No. 13/587,134 to Katsumi Tozawa et al., filed Aug. 16, 2012.
Yanmar QI 10e Cultivator Images (2), (Aug. 28, 2012).
Husqvarna TB 1000 Cultivator Images (2), (Aug. 28, 2012).

(Continued)

*Primary Examiner* — Matthew D Troutman
(74) *Attorney, Agent, or Firm* — Greenblum & Bernstein, P.L.C.

(57) ABSTRACT

A cultivator may include at least one rechargeable battery for an electrical power tool as a power source. The at least one rechargeable battery may include a plurality of rechargeable batteries. Further, the plurality of rechargeable batteries may be switched in sequence, so as to be used as the power source.

6 Claims, 6 Drawing Sheets

(56) References Cited

FOREIGN PATENT DOCUMENTS

| | | |
|---|---|---|
| JP | 2009-118753 | 6/2009 |
| JP | 2011-000005 | 1/2011 |
| JP | 2011-000006 | 1/2011 |
| JP | 2011-079510 | 4/2011 |

OTHER PUBLICATIONS

Iseki Cultivator Images (4), (Aug. 28, 2012).

Japanese Office action dated Nov. 18, 2014 along with an English-language translation thereof.

* cited by examiner

ELECTRIC-POWER CULTIVATOR

BACKGROUND OF THE INVENTION

1. Field of the Invention

The present invention relates to electric-power cultivators used for farm work. More particularly, the present invention relates to an electric-power cultivators that can use, as a power source, a rechargeable battery typically used in electrical power tools.

2. Description of Related Art

In recent years, handheld electrical power tools (e.g., electric drills, electric screwdrivers and electric cutting machines) powered by rechargeable batteries such as lithium ion batteries have been widely used. Generally, in such electrical power tools, a plurality of batteries may respectively be provided for each of the electrical power tools in order to perform uninterrupted work.

Conversely, in an industry of cultivators mainly used for farm work, relatively small electric-power cultivators powered by rechargeable batteries have been provided. Such electric-power cultivators are taught by, for example, Japanese Patent No. 4116904, and Japanese Laid-Open Patent Publications Nos. 2009-118753 and 2011-5.

However, each of the prior art electric-power cultivators requires the use of a special battery. Therefore, there is a need in the art for an improved electric-power cultivator.

BRIEF SUMMARY OF THE INVENTION

In one aspect of the present invention, a cultivator may include at least one rechargeable battery for an electrical power tool as a power source.

According to this aspect, the cultivator can be operated by the at least one rechargeable battery mainly used by an electrical power tool such as an electric drill, an electric screwdriver, an electric cutting machine or other such devices. Further, it is possible to share the at least one rechargeable battery between the electrical power tool and the cultivator. Therefore, the at least one battery can be efficiently used, so as to reduce costs for the power source of the cultivator.

Optionally, the at least one rechargeable battery may include a plurality of batteries. Further, the plurality of rechargeable batteries may be switched in sequence, so as to be used as the power source. Further, the at least one rechargeable battery may preferably be positioned behind an electric motor that is received in a main body portion of the cultivator.

Other objects, features and advantages of the present invention will be readily understood after reading the following detailed description together with the accompanying drawings and the claims.

DETAILED DESCRIPTION OF THE INVENTION

A representative embodiment of the present invention will now be described in detail with reference to FIGS. 1 to 6.

Figure 1:
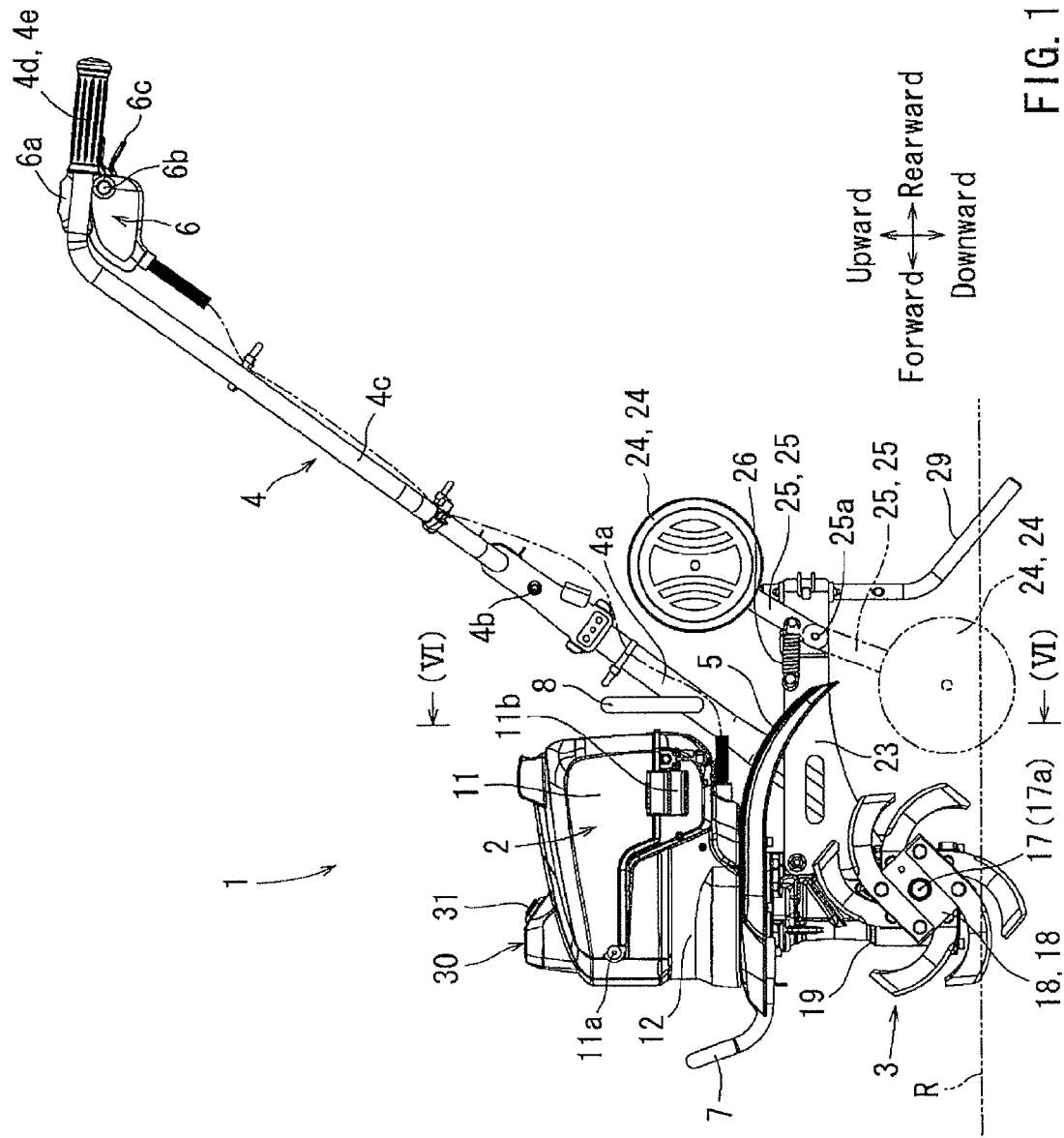
FIG. 1 is a side view of a cultivator according to a representative embodiment of the present invention.
Figure 2:
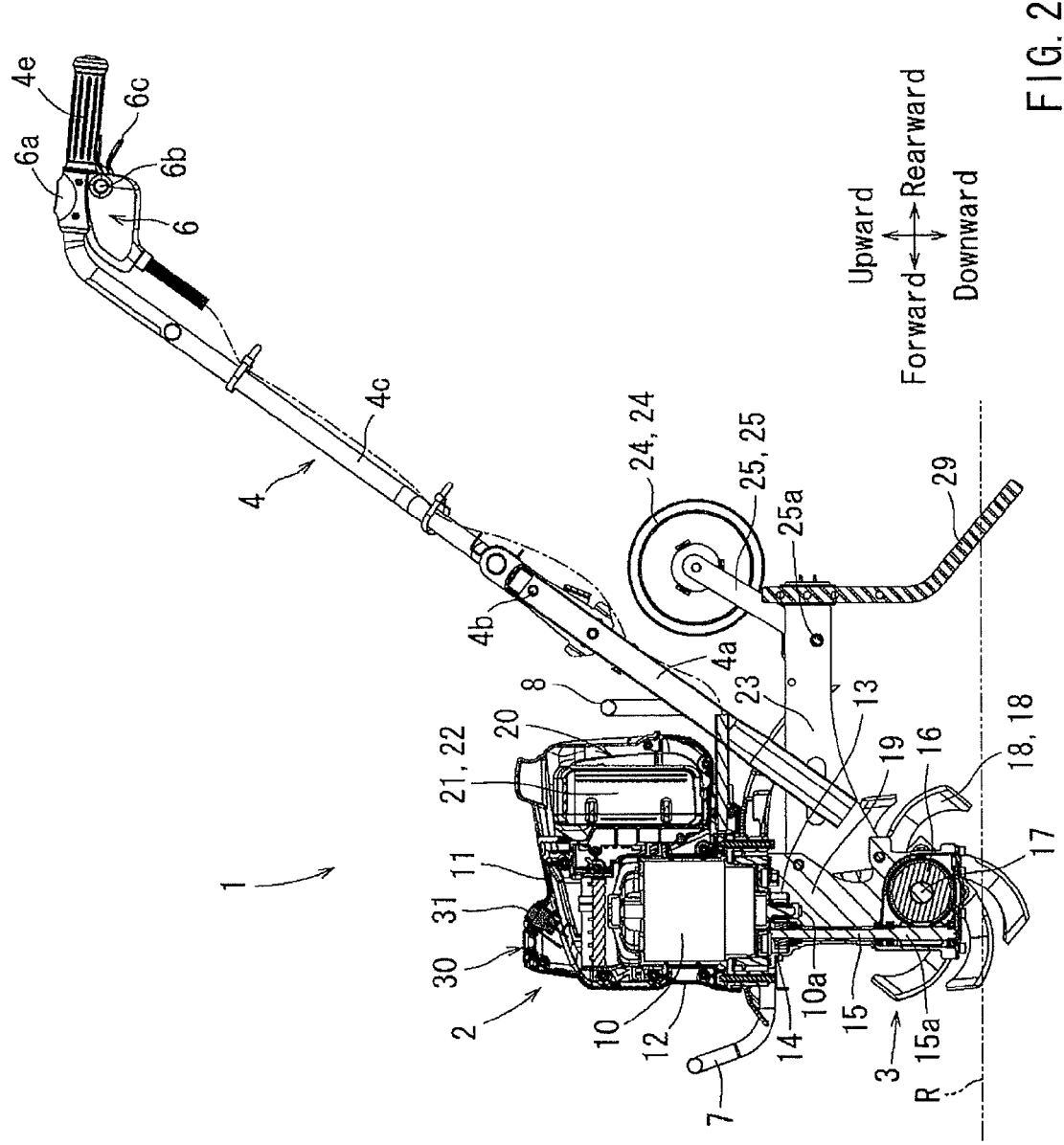
FIG. 2 is a side view of the cultivator, in which a main body portion and a functioning portion are shown in cross section.

As shown in FIG. 1, an electric-power cultivator 1 may include a main body portion 2 having an electric motor 10 (a drive source) therein, a working or functioning portion 3 and a handle portion 4. As shown in FIG. 2, the electric motor 10 may be vertically disposed in a housing 12 of the main body portion 2 while an output shaft 10a thereof is directed downwardly. A drive gear 13 may be attached to the output shaft 10a of the electric motor 10. A driven gear 14 may be meshed with the drive gear 13. The driven gear 14 may be secured to an upper end of a vertically elongated drive shaft 15. The drive shaft 15 may be rotatably supported on a casing 19 of the functioning portion 3, which casing may be attached to a lower surface of the housing 12. The drive shaft 15 may preferably be positioned so as to have a rotational axis parallel to a motor rotational axis (i.e., a rotational axis of the output shaft 10a of the electric motor 10).

Figure 6:
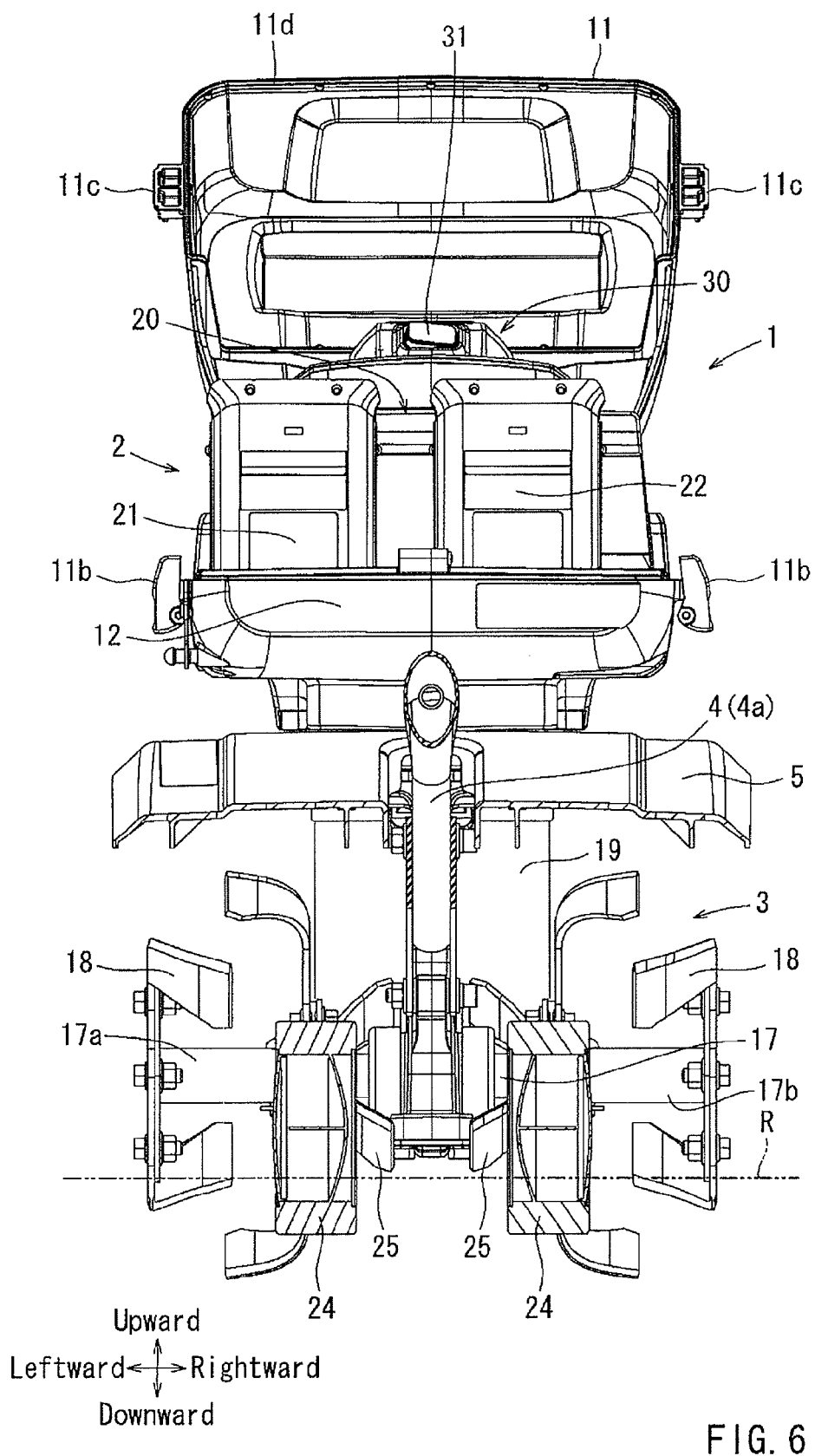
FIG. 6 is a rear view of the main body portion and the functioning portion in a condition in which the battery cover is opened and in which carrier wheels are lowered, which view is partially shown as a cross-sectional view taken along line VI-VI of FIG. 1.

A worm gear 15a may be formed in a lower end portion of the drive shaft 15. The worm gear 15a may be meshed with a worm wheel 16 that is attached to an output shaft 17. The output shaft 17 may be laterally positioned and rotatably supported on a lower portion of the casing 19. In particular, the output shaft 17 may preferably be positioned so as to have a lateral rotational axis intersecting with the rotational axis of the drive shaft 15. As best shown in FIG. 6, the output shaft 17 may have right and left end portions 17a and 17b that are respectively outwardly projected from right and left side walls of the casing 19. A pair of (right and left) cultivator blades 18 may respectively be attached to the end portions 17a and 17b of the output shaft 17.

As will be appreciated, upon actuation of the electric motor 10, the drive shaft 15 can be rotated via the drive gear 13 and the driven gear 14 that are meshed with each other. Rotational motion of the drive shaft 15 can be transmitted to the output shaft 17 via the worm gear 15a and the worm wheel 16 that are meshed with each other, so as to rotate the output shaft 17. Upon rotation of the output shaft 17, the cultivator blades 18 can be rotated to cultivate a field or ground surface R.

Figure 3:
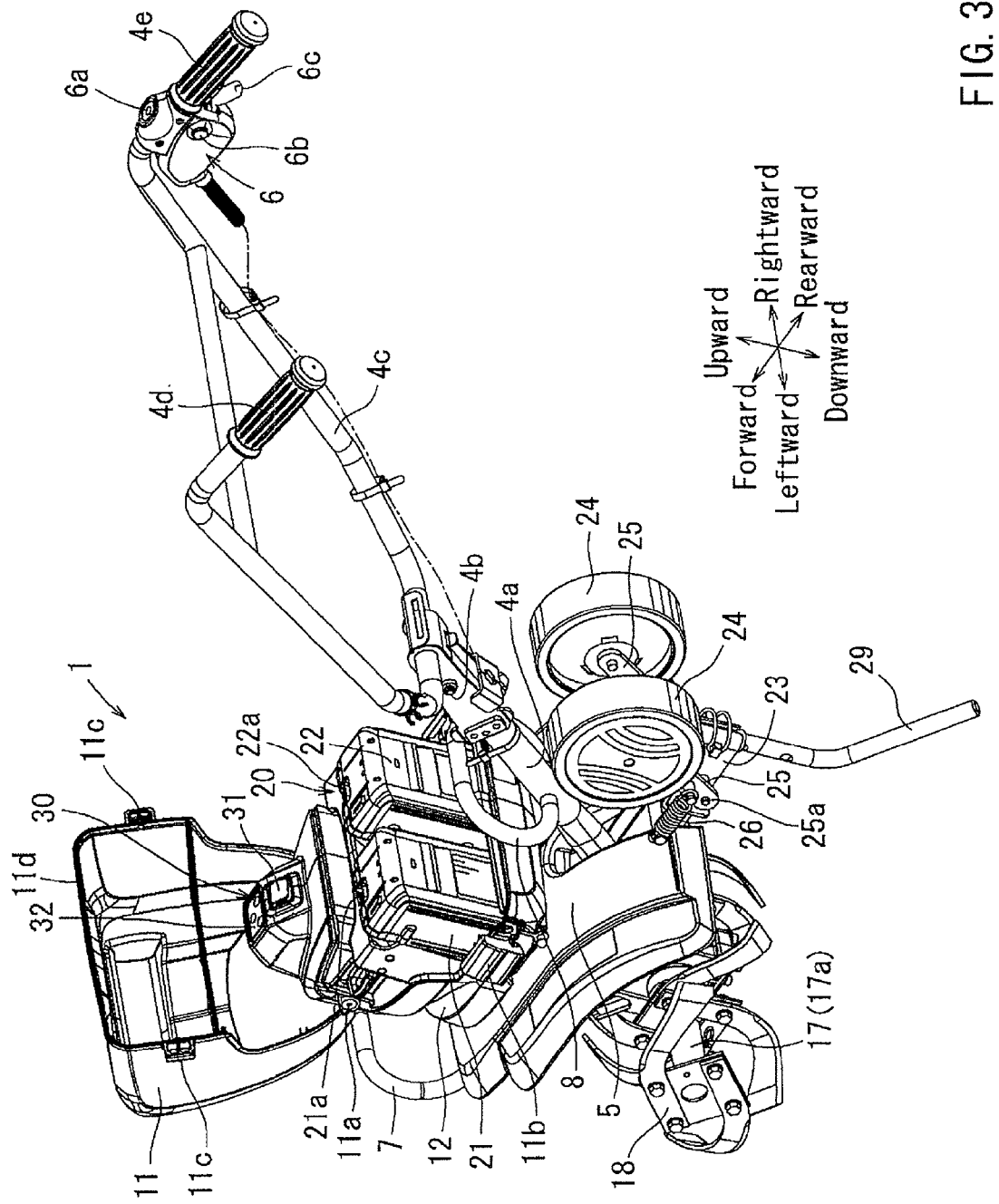
FIG. 3 is a perspective view of the cultivator, in which a battery cover is opened.

As shown in, for example, FIG. 3, a rotary cover 5 may be attached to a lower portion of the housing 12 of the main body portion 2. The rotary cover 5 may be configured to project over the right and left cultivator blades 18. That is, the rotary cover 5 may be configured to project rightward, leftward and rearward beyond the housing 12. As will be recognized, the rotary cover 5 may function to prevent soil and stones from being tossed upwards from the ground surface R by the cultivator blades 18 and flying toward a user of the cultivator 1.

The casing 19 of the functioning portion 3 may include a (subsidiary) support arm 23 that is attached thereto. The support arm 23 may extend horizontally rearward (toward the user) from the casing 19. A pair of (right and left) carrier wheels 24 may respectively be attached to the support arm 23 via a pair of stays 25. In particular, proximal ends of the stays 25 may respectively be vertically rotatably connected to both (right and left) sides of the support arm 23 via pivot shafts 25a. The carrier wheels 24 may respectively be freely rotatably attached to distal ends (rotation ends) of the stays 25. Further, a drag rod 29 may be detachably attached to a rear end portion of the support arm 23.

Figure 5:
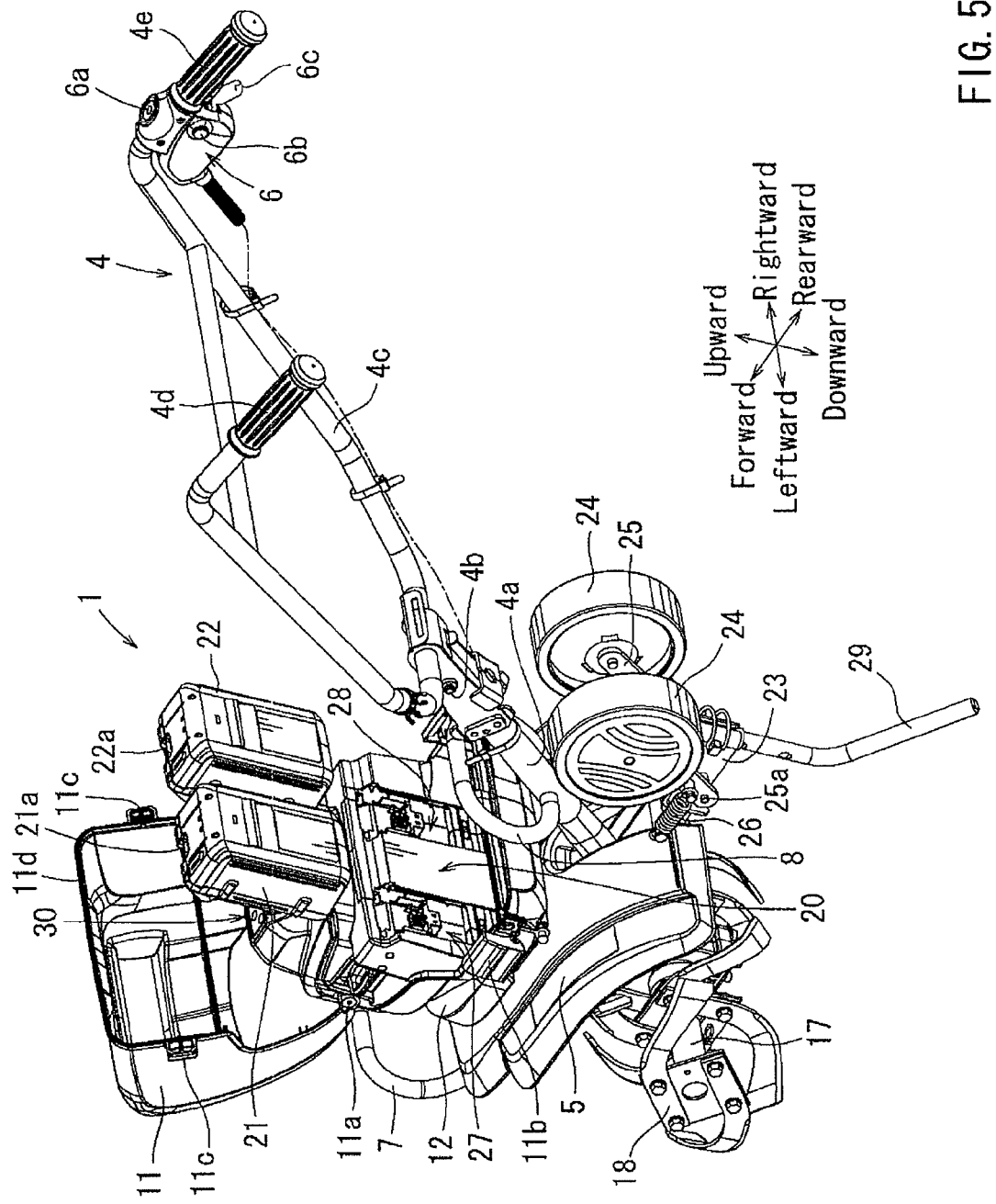
FIG. 5 is a perspective view of the cultivator, in which batteries are removed upward while the battery cover is opened.

As shown in FIGS. 1, 3 and 5, tension springs 26 (one of which is shown) may respectively be disposed between the stays 25 and the support arm 23. The tension springs 26 may be arranged and constructed such that the stays 25 can be positioned in either an upper rotational position shown by solid line in FIG. 1 or a lower rotational position shown by broken line in FIG. 1 due to spring forces thereof. As a result, the carrier wheels 24 attached to the stays 25 can be positioned in either a non-use position (a retracted position) shown by solid line in FIG. 1 or a use position (a grounding position) shown by broken line in FIG. 1 due to the spring forces of the tension springs 26. Therefore, when the carrier wheels 24 are positioned in the non-use position, the stays 25 can be manually rotated downwardly against the spring forces of the tension springs 26. Thus, the carrier wheels 24 can be moved to and held in the use position. To the contrary, when the carrier wheels 24 are positioned in the use position, the stays 25 can be manually rotated upward against the spring forces of the tension springs 26. Thus, the carrier wheels 24 can be moved to and held in the non-use position.

The drag rod 29 may be formed as a gently bent V-shaped rod. The drag rod 29 is intended to dig into the ground surface R when the cultivator 1 is used, so as to produce a drag tension or force. Due to the drag force, the cultivator blades 18 can provide an increased cultivating force in the ground surface R. Further, the drag rod 29 can be attached to the support arm 23 in various vertical attachment positions such that a downward projection amount thereof can be changed. Also, the drag rod 29 can be attached to the support arm 23 in a vertically inverted posture (not shown).

Generally, as shown in, for example, FIG. 1, when the cultivator 1 is used (i.e., when the ground surface R is cultivated using the cultivator 1), the drag rod 29 may be attached to the support arm 23, so as to be sufficiently projected downwardly (a use position). At this time, the carrier wheels 24 may be moved to the upper retracted position shown by solid line in FIG. 1. Thus, the ground surface R can be cultivated by the cultivator blades 18 while the drag rod 29 is dug into the ground surface R. To the contrary, when the cultivator 1 is moved or transferred without cultivating the ground surface R, the drag rod 29 may be repositioned to an uppermost position (a non-use position), so as to not be substantially projected downward. Alternatively, it may be reattached to the support arm 23 in the vertically inverted posture, so that it is projected upwards. At this time, the carrier wheels 24 may be moved or rotated to the lower grounding position shown by broken line in FIG. 1. Thus, the cultivator 1 can be moved using the carrier wheels 24 while the cultivator blades 18 are lifted up from the ground surface R.

The main body portion 2 may have a battery attachment portion 20 that is preferably configured to receive two batteries 21 and 22. Further, each of the batteries 21 and 22 may be a rechargeable battery for a handheld electrical power tool, e.g., an electric drill, an electric screwdriver and an electric cutting machine (not shown). An example of such a rechargeable battery is a lithium ion battery that has less natural discharge than a regular battery and is capable of being recharged. Further, each of the batteries 21 and 22 may have a rated voltage of 36 volts. Also, each of the batteries 21 and 22 may be prepared as a battery pack that is composed of a battery case and a plurality of cells (battery elements) received in the battery case. Each of the batteries 21 and 22 thus constructed can be repeatedly charged using a separately prepared battery charger (not shown).

Figure 4:
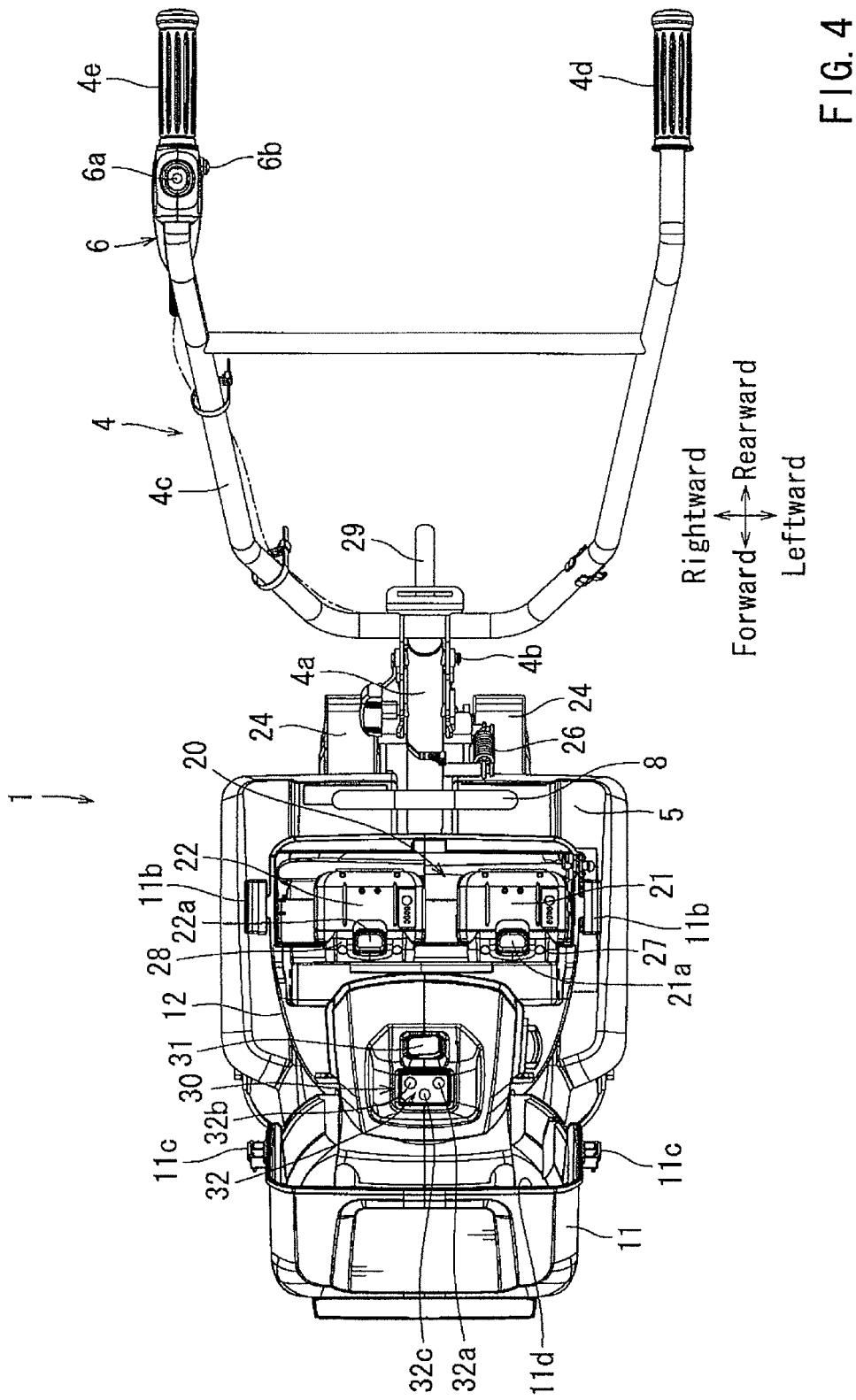
FIG. 4 is a plan view of the cultivator, in which the battery cover is opened.

As shown in FIG. 2, the battery attachment portion 20 may be positioned on a rear portion of the main body portion 2, so as to be positioned behind the electric motor 10. Further, as shown in FIGS. 3 to 5, the battery attachment portion 20 may be configured to receive the batteries 21 and 22 while the batteries 21 and 22 are laterally juxtaposed to each other. In particular, the battery attachment portion 20 may be configured to receive the batteries 21 and 22 while the batteries 21 and 22 are positioned on both sides of the motor rotational axis. Preferably, they are aligned symmetrically about the motor rotational axis. As shown in FIG. 5, the battery attachment portion 20 may have a pair of battery coupling portions 27 and 28 to which the batteries 21 and 22 can be slidably coupled. Each of the battery coupling portions 27 and 28 may have the same attachment construction as a battery coupling portion of the handheld electrical power tool in which each of the batteries 21 and 22 is used as a power source. In particular, each of the battery coupling portions 27 and 28 may have a slide coupling mechanism. That is, each of the battery coupling portions 27 and 28 may have a pair of (right and left) slide rail portions and a connecter portion positioned between the slide rail portions.

The housing 12 may have a battery cover 11 that is capable of covering the batteries 21 and 22 received in the battery attachment portion 20. The battery cover 11 may be pivotally attached to an upper portion of the housing 12 via a pair of (right and left) pivot pins 11a (one of which is shown), so as to be vertically rotated forward and rearward about the pivot pins 11a. As shown in FIG. 5, when the battery cover 11 is rotated forward (opened), the battery attachment portion 20 can be opened, so that the batteries 21 and 22 can be attached to and detached from the battery attachment portion 20. To the contrary, when the battery cover 11 is rotated rearward (closed), the battery attachment portion 20 can be closed, so that the batteries 21 and 22 received in the battery attachment portion 20 can be covered.

The batteries 21 and 22 can be coupled or attached to the battery coupling portions 27 and 28 by simply sliding the batteries 21 and 22 along the battery coupling portions 27 and 28 from above after the battery cover 11 is rotated forwardly. In this manner, the batteries 21 and 22 can be attached to the battery attachment portion 20. To the contrary, the batteries 21 and 22 can be removed or detached from the battery coupling portions 27 and 28 by simply pulling the batteries 21 and 22 upward while the battery cover 11 is opened. Thus, the batteries 21 and 22 can be detached from the battery attachment portion 20. Further, the batteries 21 and 22 can be separately attached to and detached from the battery coupling portions 27 and 28.

The batteries 21 and 22 may have locking members (not shown) formed therein. The locking members may be arranged and constructed to automatically engage the battery coupling portions 27 and 28 when the batteries 21 and 22 are attached to the battery coupling portions 27 and 28 by sliding the same along the battery coupling portions 27 and 28 from above. Therefore, when the batteries 21 and 22 are attached to the battery coupling portions 27 and 28, the batteries 21 and 22 can be securely connected to the battery coupling portions 27 and 28 via the locking members, so that an attached condition of the batteries 21 and 22 to the battery coupling portions 27 and 28 can be locked. Conversely, as shown in FIG. 4, the batteries 21 and 22 may respectively have unlocking members 21a and 22a formed in an upper portion thereof. The unlocking members 21a and 22a may be arranged and constructed to disengage the locking members from the battery coupling portions 27 and 28 when they are pressed down in a condition in which the locking members engage the battery coupling portions 27 and 28. That is, when the unlocking members 21a and 22a are pressed down in the condition in which the locking members engage the battery coupling portions 27 and 28, the attached condition of the batteries 21 and 22 to the battery coupling portions 27 and 28 can be unlocked. Therefore, in order to detach the batteries 21 and 22 from the battery coupling portions 27 and 28, the unlocking members 21a and 22a may be pressed down to unlock the attached condition of the batteries 21 and 22 before the batteries 21 and 22 are pulled upward.

As shown in FIG. 1, the main body portion 2 may have a battery switching portion 30 that is disposed on an upper portion thereof. The battery switching portion 30 may include a switch 31 and an operation indicator 32. The switch 31 is for the user to switch electrical connections between the batteries 21 and 22 and a power circuit (not shown) in the main body portion 2. Upon manipulation of the switch 31, either one of the batteries 21 and 22 can be electrically connected to the power circuit (i.e., either one of the batteries 21 and 22 can be operative) to enable the power circuit to apply electrical power to the electric motor 10. In particular, when the switch 31 is moved to the left, the battery 21 (the left-side battery) can be operative, so as to provide a condition in which electrical power can be applied to the electric motor 10 via the battery 21. To the contrary, when the switch 31 is moved to the right, the battery 22 (the right-side battery) can be operative, so as to provide a condition in which the electrical power can be applied to the electric motor 10 via the battery 22.

The operation indicator 32 is constructed to indicate which of the batteries 21 and 22 is in operation. In particular, the operation indicator 32 may have a pair of (right and left) green operation indicator lamps 32a and 32b. When the switch 31 is moved to the left, i.e., when the (left) battery 21 is operative, the (left) operation indicator lamp 32a can be turned on. To the contrary, when the switch 31 is moved to the right, i.e., when the (right) battery 22 is operative, the (right) operation indicator lamp 32b can be turned on. Thus, the user of the cultivator 1 can know simply view the operation indicator 32 and realize which of the batteries 21 and 22 is in use.

Further, the operation indicator 32 may additionally have a red warning lamp 32c. The warning lamp 32c can be constructed to be turned on when a battery level of the battery 21 or 22 is reduced. Also, the warning lamp 32c can be turned on when power supply in the batteries 21 and 22 and the battery coupling portions 27 and 28 cannot be performed normally, e.g., when excess current or other such hazard is generated.

The battery 21 (or 22) that is switched to an inoperative condition by manipulating the switch 31 can be left in the battery coupling portion 27 (or 28) without removing it therefrom. Alternatively it can be withdrawn from the battery coupling portion 27 (or 28). When the battery 21 (or 22) is removed from the battery coupling portion 27 (or 28), the cultivator 1 can be used in a condition reduced in weight. Naturally, the battery 21 (or 22) removed from the battery coupling portion 27 (or 28) can be inserted into the battery coupling portion 27 (or 28) again after it is recharged using a recharger (not shown), so that the cultivator 1 can be continuously used over an elongated time period.

As previously described, the battery attachment portion 20 in which the battery coupling portions 27 and 28 are formed can be closed by the battery cover 11. As shown in FIG. 6, the battery cover 11 may have a rubber sealing member 11d for waterproofing purposes. The sealing member 11d may preferably be circumferentially attached to an open end periphery of the battery cover 11, so as to extend over the entire length thereof. Thus, when the battery cover 11 is closed, the sealing member 11d can elastically contact a bottom surface of the battery attachment portion 20, so as to prevent the entrance of water (such as rainwater), dust or other such materials. Further, the battery cover 11 may have a pair of (right and left) engagement portions 11c. The engagement portions 11c may be arranged and constructed to engage a pair of (right and left) engagement hooks 11b formed in the battery attachment portion 20 when the battery cover 11 is closed. Thus, when the battery cover 11 is closed, the engagement portions 11c may automatically engage the engagement hooks 11b, so that the battery cover 11 can be maintained (locked) in a closed condition. Further, because the engagement portions 11c can be easily disengaged from the engagement hooks 11b through simple manipulation, the battery cover 11 can be easily opened.

As shown in FIG. 1, the handle portion 4 of the cultivator 1 may be positioned behind the main body portion 2 so as to extend obliquely upward and rearward. In particular, the handle portion 4 may have a base portion 4a and a tiltable portion 4c. The base portion 4a may be secured to the support 23 so as to extend obliquely upward and rearward. Conversely, as shown in FIG. 4, the tiltable portion 4c may have a Y-shape (a centrally branched shape) and have a pair of grips 4d and 4e that are capable of being grasped by the user's hands. The grips 4d and 4e may be attached to distal end portions (upper end portions) of the tiltable portion 4c. A proximal end portion (a central branched portion) of the tiltable portion 4c may be connected to an upper end portion of the base portion 4a via a pivot shaft 4b such that the tiltable portion 4c can be tiltable back and froth. Further, a tilt angle of the tiltable portion 4c relative to the base portion 4a can be gradually changed and adjusted. Therefore, the grips 4d and 4e can be appropriately adjusted in height for a user's body size. Further, the tiltable portion 4c can be tilted over the main body portion 2 by fully tilting forward about the pivot shaft 4b.

The tiltable portion 4c may have an operation switch portion 6 that is positioned adjacent to the distal end portion of one (the right grip 4e in this embodiment) of the grips 4d and 4e. The operation switch portion 6 may include an upwardly facing power switch 6a, a laterally facing unlock switch 6b and a rearwardly projecting lever-type actuator switch 6c. When the user presses the power switch 6a with the finger of the hand grasping the right grip 4e, electricity can be fed to the power circuit of the main body portion 2, so as to provide a condition in which the electric motor 10 can be activated. Thereafter, when the actuator switch 6c is pulled while the unlock switch 6b is pressed, the electric motor 10 can be started, so that the cultivator blades 18 can be rotated. If the actuator switch 6c is pulled while the unlock switch 6b is not pressed, the actuator switch 6c cannot function and the electric motor 10 cannot be started.

Further, the cultivator 1 may include carrier handles 7 and 8 that are respectively attached to a front portion of the casing 19 of the functioning portion 3 and the base portion 4a of the handle portion 4. Therefore, the user can grasp the carrier handles 7 and 8 with both hands in order to carry the cultivator 1.

As described above, the cultivator 1 thus constructed can be powered by the batteries 21 and 22 (the rechargeable batteries) mainly used for the handheld electrical power tool such as the electric drill, the electric screwdriver, the electric cutting machine or other such devices. Therefore, it is not necessary to prepare a special battery for the cultivator 1.

As previously described, each of the batteries 21 and 22 may be the lithium ion battery, which is preferably prepared as the battery pack that is composed of the battery case and the cells received in the battery case. The lithium ion battery may have less natural discharge and be capable of being recharged. Therefore, it is possible to conveniently and advantageously use the cultivator 1. In addition, it is possible to share the batteries 21 and 22 between the electrical power tool and the cultivator 1. Thus, the batteries 21 and 22 can be efficiently used. As a result, it is possible to reduce costs for the power source of the cultivator 1.

Further, the batteries 21 and 22 can be removed from the cultivator 1. Therefore, the cultivator 1 can be carried while its weight is reduced.

The cultivator 1 may have the two batteries 21 and 22 loaded thereon. The batteries 21 and 22 can be used as the power source in sequence by switching the batteries 21 and 22 (i.e., by switching the electrical connections between the batteries 21 and 22 and the power circuit of the main body portion 2). Therefore, it is possible to use the cultivator 1 over a prolonged period of time. Further, switching of the batteries 21 and 22 can be manually performed by simply manipulating the switch 31. Therefore, timing of the switching of the batteries 21 and 22 can be arbitrarily determined by the user.

Further, because the cultivator 1 is constructed such that the batteries 21 and 22 relatively heavy in weight can be loaded behind the electric motor 10, weight of the batteries 21 and 22 can be efficiently applied to the drag rod 29 during cultivation. Therefore, it is possible to effectively cultivate the ground surface R without increasing the burden of the user. This means that the cultivator 1 may have an increased operability and workability.

Further, because the cultivator 1 may be constructed such that the batteries 21 and 22 can be loaded adjacent to each other in a widthwise direction (laterally), the cultivator 1 can be laterally well-balanced. This also means that the cultivator 1 may have an increased operability and workability.

Further, the cultivator 1 may be constructed such that the batteries 21 and 22 can be unloaded therefrom by pulling the batteries 21 and 22 upward after the battery cover 11 is opened. That is, an unloading direction of each of the batteries 21 and 22 may correspond to an upward direction. Therefore, the batteries 21 and 22 can be easily and quickly removed from the cultivator 1 without interfering with any other elements of the cultivator 1. Further, according to the cultivator 1 thus constructed, the batteries 21 and 22 can be removed or unloaded from the cultivator 1 in a manner whereby a user's hand or wrist is not uncomfortably twisted by relatively heavy weight of the batteries 21 and 22. Therefore, the batteries 21 and 22 can be unloaded from the cultivator 1 with a reduced risk in insuring the user's wrist.

Further, the cultivator 1 may be constructed such that the batteries 21 and 22 can be loaded thereon from above. That is, a loading direction of each of the batteries 21 and 22 may correspond to a downward direction. Therefore, the batteries 21 and 22 can be easily and quickly loaded on the cultivator 1 using their own weight. Thus, in this embodiment, the unloading direction and the loading direction of each of the batteries 21 and 22 correspond to a vertical direction. Therefore, the batteries 21 and 21 can be easily and quickly loaded onto and unloaded from the cultivator 1 without unduly burdening the user.

Various changes and modifications may be made to the present embodiment. For example, in the embodiments, the cultivator 1 is constructed such that the two batteries 21 and 22 can be loaded thereon. However, the cultivator 1 can be constructed such that three or more batteries can be loaded thereon. Further, the cultivator 1 can be constructed such that a single battery can be loaded thereon as necessary.

In the present embodiment, slide coupling-type batteries are exemplified as the batteries 21 and 22 for the electrical power tool. However, insertion (plug-in) coupling-type batteries can be used as the batteries 21 and 22.

In this embodiment, the cultivator 1 is constructed such that the batteries 21 and 22 can be loaded onto and unloaded from the cultivator 1 in the vertical direction. However, the cultivator 1 can be constructed such that the batteries 21 and 22 can be loaded thereon and unloaded therefrom in a direction other than the vertical direction, e.g., a lateral direction, a longitudinal direction, an oblique direction or other such directions.

Further, in the present embodiment, each of the batteries 21 and 22 has a rated voltage of 36 volts. However, each of the batteries 21 and 22 may have a rated voltage other than 36 volts, e.g., 18 volts and 10.8 volts. Batteries of other voltages may also be used.

In the present embodiment, the cultivator 1 is constructed such that the batteries 21 and 22 can be separately used as the power source in sequence by manipulating the switch 31. However, the cultivator 1 can be constructed such that the batteries 21 and 22 can be connected in series. That is, the cultivator 1 can be constructed such that the batteries 21 and 22 can be simultaneously used as the power source. In such a case, an increased voltage (i.e., a sum of voltages of the batteries 21 and 22) can be provided.

In the present embodiment, the cultivator 1 is constructed such that the batteries 21 and 22 can be manually switched by manipulating the switch 31. However, the cultivator 1 can be modified such that the batteries 21 and 22 can be automatically switched when the battery level of the operational battery (the battery 21 or 22) is reduced to a predetermined level or less.

A representative example of the present invention has been described in detail with reference to the attached drawings. This detailed description is merely intended to teach a person of skill in the art further details for practicing preferred aspects of the present invention and is not intended to limit the scope of the invention. Only the claims define the scope of the claimed invention. Therefore, combinations of features and steps disclosed in the foregoing detailed description may not be necessary to practice the invention in the broadest sense, and are instead taught merely to particularly describe detailed representative examples of the invention. Moreover, the various features taught in this specification may be combined in ways that are not specifically enumerated in order to obtain additional useful embodiments of the present invention.

What is claimed is:

1. A cultivator for cultivating a ground surface, the cultivator comprising:
    a main body housing an electric motor, the electric motor having an output shaft rotational axis extending in a heightwise direction of the cultivator;
    a plurality of cultivator blades on a lower side of the main body and rotatable by the electric motor during an operation of the cultivator about a blade rotational axis extending in a widthwise direction of the cultivator that is generally orthogonal to the output shaft rotational axis;
    a rechargeable battery receiver on an upper side of the main body having a rechargeable battery coupler includes a pair of slide rail portions and a connector portion provided between the pair of slide rail portions to lockingly engage at least one rechargeable battery; and
    a rechargeable battery cover pivotally attached to the main body to cover the rechargeable battery receiver, wherein the battery receiver is positioned at a rear side of the electric motor in a moving direction of the cultivator and the at least one rechargeable battery is insertable in the battery receiver in a downward direction generally parallel to the output shaft rotational axis at a position that is offset from the blade rotational axis in a radial direction thereof.

2. The cultivator as defined in claim 1, further comprising at least one rechargeable battery which can be attachably connected to the rechargeable battery receiver, the at least one rechargeable battery also being usable with an electric power tool and configured to power the electric motor during an operation of the cultivator.

3. The cultivator as defined in claim 1, wherein the at least one rechargeable battery comprises a plurality of rechargeable batteries, and wherein the plurality of rechargeable batteries are laterally juxtaposed to one another, and wherein at least one of the plurality of rechargeable batteries is positioned on an opposite side of a rotational axis of the electric motor relative to the remaining plurality of rechargeable batteries.

4. A cultivator for cultivating a ground surface, the cultivator comprising:
   a main body housing an electric motor, the electric motor having an output shaft rotational axis extending in a heightwise direction of the cultivator;
   a plurality of cultivator blades on a lower side of the main body and rotatable by the electric motor during an operation of the cultivator about a blade rotational axis extending in a widthwise direction of the cultivator that is generally orthogonal to the output shaft rotational axis;
   a rechargeable battery receiver on an upper side of the main body having a rechargeable battery coupler that includes a pair of slide rail portions and a connector portion provided between the pair of slide rail portions to lockingly engage at least one rechargeable battery; and
   a rechargeable battery cover pivotally attached to the main body to cover at least one rechargeable battery received by the rechargeable battery receiver, wherein
   the rechargeable battery receiver is positioned at a rear side of the electric motor in a moving direction of the cultivator, and the at least one rechargeable battery is insertable in the rechargeable battery receiver in a downward direction generally parallel to the output shaft rotational axis at a position that is offset from the blade rotational axis in a radial direction thereof.

5. The cultivator as defined in claim 4 further comprising at least one rechargeable battery which can be attachably connected to the rechargeable battery receiver, the at least one rechargeable battery also being usable with an electric power tool and configured to power the electric motor during an operation of the cultivator.

6. The cultivator as defined in claim 4, wherein the at least one rechargeable battery comprises a plurality of rechargeable batteries, and wherein the plurality of rechargeable batteries are laterally juxtaposed to one another, and wherein at least one of the plurality of rechargeable batteries is positioned on an opposite side of a rotational axis of the electric motor relative to the remaining plurality of rechargeable batteries.

* * * * *